US009511280B1

(12) United States Patent
Hawk et al.

(10) Patent No.: US 9,511,280 B1
(45) Date of Patent: Dec. 6, 2016

(54) ONLINE GAMING SYSTEM INCLUDING VIRTUAL ITEMS THAT TRANSCEND MULTIPLE CHARACTER DEATHS

(71) Applicant: KABAM, INC., San Francisco, CA (US)

(72) Inventors: Travis Hawk, San Bruno, CA (US); Willem Rosenthal, San Francisco, CA (US); Michael Sellers, Pacifica, CA (US)

(73) Assignee: Kabam, Inc., San Francisco, CA (US)

( * ) Notice: Subject to any disclaimer, the term of this patent is extended or adjusted under 35 U.S.C. 154(b) by 251 days.

(21) Appl. No.: 14/194,643

(22) Filed: Feb. 28, 2014

(51) Int. Cl.
| | | |
|---|---|---|
| *A63F 13/00* | (2014.01) | |
| *A63F 13/12* | (2006.01) | |
| *A63F 13/30* | (2014.01) | |
| *A63F 13/57* | (2014.01) | |
| *A63F 13/58* | (2014.01) | |

(52) U.S. Cl.
CPC ............... *A63F 13/12* (2013.01); *A63F 13/57* (2014.09); *A63F 13/58* (2014.09)

(58) Field of Classification Search
CPC ........... A63F 13/00; A63F 13/57; A63F 13/58
USPC ........................................................... 463/1
See application file for complete search history.

(56) References Cited

U.S. PATENT DOCUMENTS

| | | | |
|---|---|---|---|
| 7,677,979 B2 | 3/2010 | Van Luchene | 463/42 |
| 7,974,901 B2 | 7/2011 | Van Luchene | 705/35 |
| 8,566,111 B2 | 10/2013 | Jung et al. | 705/1.1 |
| 2005/0143174 A1 | 6/2005 | Goldman et al. | 463/42 |
| 2007/0219001 A1* | 9/2007 | Mueller | A63F 13/10 463/43 |
| 2008/0090628 A1* | 4/2008 | Mueller | A63F 13/10 463/1 |
| 2008/0133392 A1* | 6/2008 | Jung | G06Q 20/12 705/35 |
| 2013/0339228 A1* | 12/2013 | Shuster | G06F 9/541 705/40 |

* cited by examiner

*Primary Examiner* — Jason Skaarup
*Assistant Examiner* — Ryan Hsu
(74) *Attorney, Agent, or Firm* — Sheppard Mullin Richter & Hampton LLP

(57) ABSTRACT

An online gaming system including virtual items that transcend multiple character deaths. The online game may take place within a virtual space. Users may interact with the online game by controlling virtual characters within the virtual space. A health parameter may be determined for the characters such that responsive to the health parameter reaching a threshold level, the character may be considered dead in the online game. After character death, users must take on new characters to interact with the online game. User-level inventories may be managed that include one or more virtual items which are made available to the user even after the death of a character which was used when the item was acquired.

18 Claims, 3 Drawing Sheets

ONLINE GAMING SYSTEM INCLUDING VIRTUAL ITEMS THAT TRANSCEND MULTIPLE CHARACTER DEATHS

FIELD OF THE DISCLOSURE

This disclosure relates to permanent death type online gaming systems.

BACKGROUND

Users may access virtual spaces via client computing platforms. A virtual space may include an online game taking place within the virtual space. Virtual items usable within the virtual space and/or online game may be acquired by the users. Virtual items may include one or more of a virtual weapon, a tool, a food, a currency, a reward, a bonus, health, a potion, an enhancement, a mount, a power-up, a speed-up, clothing, a vehicle, an anatomical feature of a character or game entity, a troop or troop type, a pet, a virtual resource, and/or other virtual items and/or goods. Users may store and/or otherwise manage their acquired virtual items in virtual inventories.

An online game may be of the "permanent death" type game. In permanent death type gameplay, player characters controlled by the users of the virtual space may "die" and may otherwise no longer be available to the users to interact with the online game within the virtual space. Users therefore must take on new characters to interact with the online game. Death of a character may be determined by monitoring a heath parameter of the character such that responsive to the heath parameter reaching a threshold level, the character may be permanently removed from the virtual space.

SUMMARY

Accordingly, one aspect of the disclosure relates to a system for online gaming including virtual items that transcend multiple character deaths. The online game may take place in a virtual space. The virtual space may be configured such that virtual characters controlled by users in the virtual space may permanently "die" and no longer become available to the users such that users must control new characters to interact with the online game. The disclosure herein describes systems and methods in which there are virtual items that the users can acquire that transcend multiple character deaths and therefor may be made available for use in the online game even after the death of a virtual character which was used to acquire the virtual item.

The system herein may include one or more physical processors configured to execute one or more computer components for implementing an instance of a virtual space and/or an online game taking place within the virtual space and to facilitate the participation of one or more users in virtual space and/or the online game. The computer program components may include one or more of a game component, a user component, a shop component, a user-level items component, a lifespan parameters component, a gameplay parameters component, and/or other components.

The game component may be configured to execute an instance of an online game, and to implement the instance of the online game to facilitate user participation in the online game that takes place in a virtual space. Users may participate with the online game by controlling virtual characters in the virtual space. The virtual characters may include a first virtual character controlled by a first user. A health parameter of the characters in the online game may be determined such that responsive to the health parameter for the first character reaching a threshold level, the first character is considered dead in the online game and is no longer available to the first user. Subsequent to such death of the first character, the first user must control a second character in the virtual space to participate in the online game.

The user component may be configured to manage virtual item inventories associated with the users in the online game. The inventories may include one or more virtual items available for use with characters controlled by the users in the online game. The inventories may include user-level inventories that include one or more virtual items that transcend multiple deaths of virtual characters. The virtual items included in the user-level inventories may be characterized by gameplay parameters that impact gameplay in the online game and lifespan parameters that determine the number of characters over which the virtual items will be available. For example, virtual items included in a first user-level inventory for the first user may be usable with both the first character and the second character subsequent to the death of the first character.

The shop component may be configured to effectuate presentation of offers to sell virtual items to users for consideration through a shop interface.

The user-level item component may be configured to maintain the lifespan parameters (determined by the lifespan parameters component) and gameplay parameters (determined by the gameplay parameters component) for the individual virtual items included in the user-level virtual inventories.

The lifespan parameters component may be configured to determine the lifespan parameters for the virtual items included in the user-level inventories. The lifespan parameter of any virtual item included in the user-level virtual inventories may have an initial lifespan value. The lifespan parameter may change throughout gameplay. The lifespan parameter may be decremented and/or incremented. For example the lifespan parameter component may be configured to decrement the lifespan parameter of any virtual items included in the first user-level inventory responsive to the death of the first character.

The gameplay parameters component may be configured to determine the gameplay parameters of the virtual items included in the user-level virtual inventories. The gameplay parameters of the virtual items included in the user-level inventories may include benefits that the virtual items provide the users during gameplay in the online game when the benefits are activated. The benefits may be activated based on consideration received from the users. The consideration received from the users to activate the benefits may be satisfied in an exchange of virtual items, virtual currency, or real currency.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
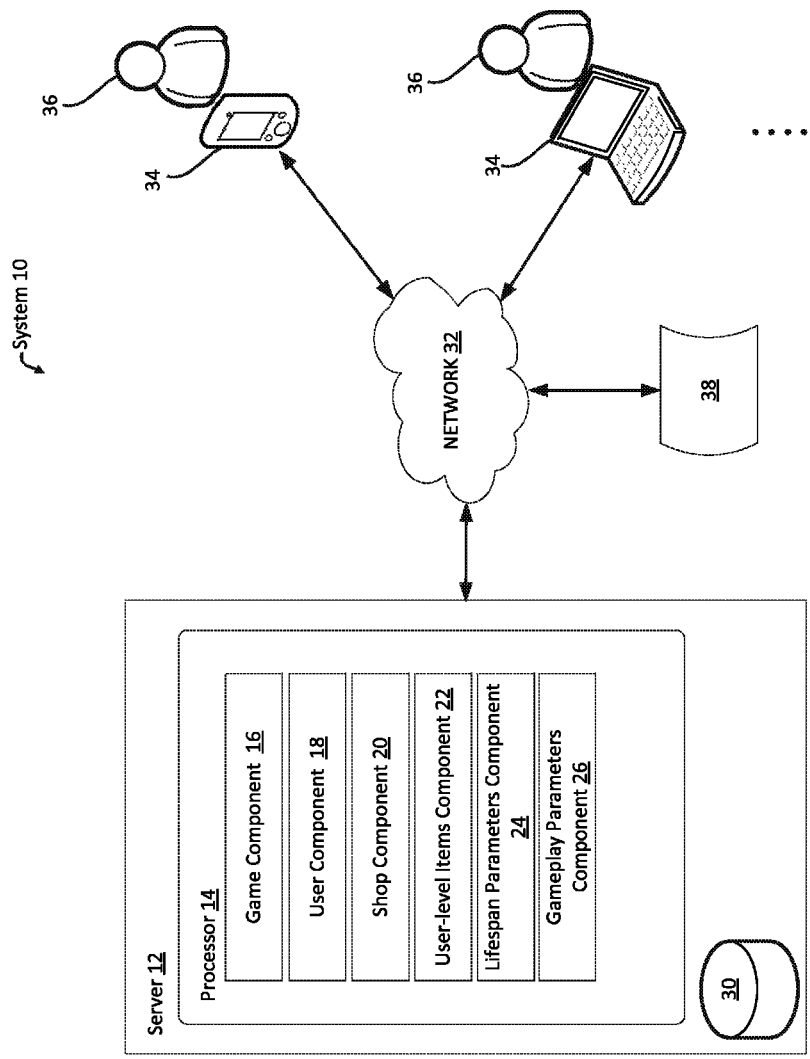
FIG. 1 illustrates a system for online gaming including virtual items that transcend multiple character deaths.

FIG. 1 illustrates a system 10 configured to host a virtual space that includes virtual items that transcend multiple deaths of virtual characters controlled by the users within the virtual space. The virtual space may include an online game taking place in the virtual space. Users may participate with the virtual space and/or the online game by controlling virtual characters in the virtual space and/or online game. The online game may be a permanent death online game. The virtual characters controlled by the users may be associated with a health parameter. When the health parameter reaches a threshold level, the virtual character may be considered dead in the virtual space such that the users must take on new characters to control in the virtual space to participate in the online game.

The users may acquire virtual items and/or goods that are usable with the virtual characters in the virtual space and/or online game. The virtual items and/or goods may be managed, stored, and/or otherwise included in virtual item inventories associated with the users. One or more virtual items may be configured to transcend multiple character deaths (e.g., character generations), such that the one or more virtual items are made available to the users even if a character dies and a new character is taken on. Such virtual items may be termed "user-level" virtual items and may be included in "user-level" inventories.

One or more virtual items may be associated only with a virtual character the user is controlling when the virtual item is acquired (e.g., purchased and/or acquired during gameplay). These one or more virtual items may be made available to the users only during the lifespan of the associated virtual character (e.g., the generation of the associated virtual character). Such virtual items may be included in "character-level" inventories.

Virtual items and/or goods may include one or more of a virtual weapon, a tool, a food, a currency, a reward, a bonus, health, a potion, an enhancement, a mount, a power-up, a speed-up, clothing, a vehicle, an anatomical feature of a character or game entity, a troop or troop type, a pet, a virtual resource, and/or other virtual items and/or goods. Virtual items and/or virtual goods may be usable within the virtual space and/or an online game that takes place in the virtual space.

In FIG. 1, providing the virtual space may include hosting the virtual space over a network 32, such as the Internet. A host server may include one or more processors configured to execute one or more computer components for implementing an instance of a virtual space and/or an online game taking place within the virtual space and to facilitate the participation of one or more users in virtual space and/or the online game. The host server may be a game server 12. The server 12 may include processor(s) 14.

The computer program components may include one or more of a game component 16, a user component 18, a shop component 20, a user-level items component 22, a lifespan parameters component 24, a gameplay parameters component 26, and/or other components. The server 12 may be configured to communicate with one or more client computing platforms 34, according to client/server architecture. The client computing platforms 34 can include, for example, a cellular telephone, a smartphone, a laptop, a tablet computer, a desktop computer, a television set-top box, smart TV, a gaming console, and/or other device suitable for the intended purposes as described herein and/or other considerations. The users 36 may access system 10 and/or the virtual space via client computing platforms 34.

The game component 16 may be configured to implement an instance of the virtual space executed by the computer components to determine state of the virtual space. The state may then be communicated (e.g., via streaming visual data, via object/position data, and/or other state information) from server 12 to client computing platforms 34 for presentation to users 36. The state determined and transmitted to a given client computing platform 34 may correspond to a view for a user character being controlled by a user 36 via input devices (e.g., a controller) at the given client computing platform 34. The state determined and presented to a given client computing platform 34 may correspond to a location in the virtual space (e.g., location in the game). The view described by the state for the given client computing platform 34 may correspond, for example, to the location from which the view is taken, the location the view depicts, and/or other locations, a zoom ratio, a dimensionality of objects, a point-of-view, and/or view parameters of the view. One or more of the view parameters may be selectable by the users 36.

An instance of the virtual space may comprise a simulated space that is accessible by users 36 via clients (e.g., client computing platforms 34) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which state of the virtual space is determined by game component 16 is not intended to be limiting. The game component 16 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game component 16, users 36 may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user 36 with which it is associated. The user controlled element(s) may move through and interact with the virtual space (e.g., non-user characters in the virtual space, other objects in the virtual space). The user controlled elements controlled by and/or associated with a given user 36 may be created and/or customized by the given user. The user may have one or more "inventories" of virtual items and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 34. The users may interact with each other through communications exchanged within the virtual space. Such communications may include one or more of textual chat, instant messages, private messages, voice communications, and/or other communications. Communications may be received and entered by the users 36 via their respective client computing platforms 34. Communications may be routed to and from the appropriate users through server 12 (e.g., through game component 16) and/or through communications which are external to the system 10 (e.g., text messaging services associated with the client computing platforms 34).

The instance of the virtual space and/or the online game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, changes to the virtual items available for use in the online game, and/or other changes.

The instance of the virtual space and/or the online game may include "permanent death" rules and/or restriction. Permanent death may refer to gameplay modes and/or instances of gameplay in which characters controlled by users to interact within the virtual space permanently die within the virtual space and are thereafter removed from the virtual space. Users may then take on new characters to interact with the virtual space. Thus, characters taken on by the users may be associated with a lifespan (e.g., the time between the characters being taken on until the time of permanent death of the character). The game component 16 (and/or other components) may be configured to implement penalties for each instance of character death.

Permanent death of a virtual character may be determined by a heath parameter of the characters, and/or other measure configured to determine the lifespan of the character. Health parameters may be considered in a variety of ways. As a first example, a heath parameter may be a time-dependent parameter such as a timer or "count down" which when a threshold is met (e.g., the end of the count down), the player character experiences permanent death. The time-dependent health parameter may refer to real time (e.g., in seconds, minutes, hours, etc.), virtual time (which is slower or faster than real time), and/or other time-dependent measure. The health parameter "count down" may run during times of gameplay only (e.g., only when the user is logged in), and/or during all time (e.g., whether or not the user is logged-in). For example, a given virtual character may have a pre-determined real time lifespan, such as 10 weeks (or other amount), which may run all the time, or only when the user is logged into the virtual space, and/or other considerations.

In some implementations, the health parameter may be a quantitative and/or qualitative value which is changed (e.g., decremented and/or incremented) until the value reaches a threshold value (e.g., "0") which may trigger permanent death. For example, the health parameter may be a number value on a sliding scale (e.g., "0" to "100"). The health parameter may have an initial value when the player character is taken on (e.g., 100 or other amount) which reduces (or increases) during gameplay. For example, if the character is injured, the user is inactive within the virtual space, the user fails to achieve an objective, etc., the health parameter may decrease accordingly. When the health parameter reaches a threshold value (e.g., 0), permanent death may occur.

In some implementations, the game component 16 may be configured such that users may increase their character health parameter. Health parameter increases may be accomplished in a variety of ways, for example, through exchange of consideration, performing in game tasks, acquiring virtual items (e.g., medicine), and/or other considerations. Health parameters and/or changes to the health parameters associated with the virtual characters played by users in the virtual space may be considered in other ways.

Figure 2:
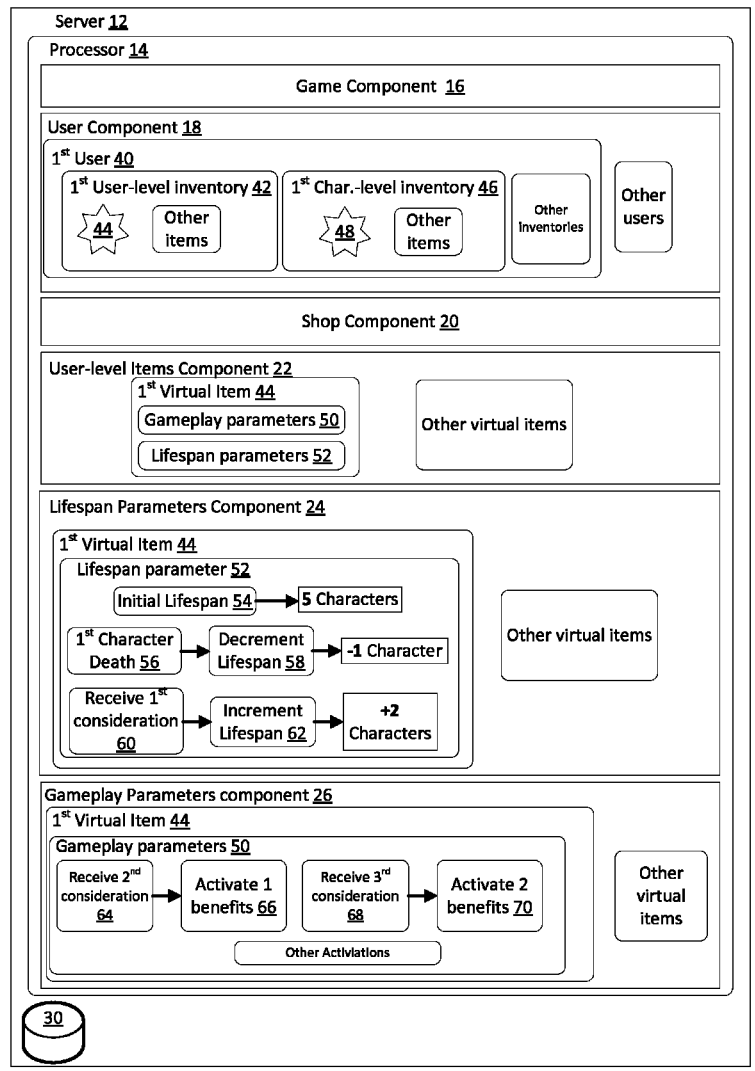
FIG. 2 illustrates an implementation of the server employed in the system depicted in FIG. 1.

As an illustrative example in FIG. 2, the game component 16 may be configured to implement an instance of an online game within a virtual space. Users may participate with the online game by controlling virtual characters in the virtual space. The virtual characters may include a first virtual character (not shown) controlled by a first user 40, and/or other virtual characters controlled by other users. A health parameter of the characters in the online game may be determined as described herein and/or by other considerations. In some implementations, responsive to the health parameter for the first character reaching a threshold level, the first character is considered dead in the online game and is no longer available to the first user 40. Subsequent to such death of the first character, the first user 40 must control a second character (not shown) in the virtual space to participate in the online game.

Returning to FIG. 1, the user component 18 may be configured to access and/or manage one or more user profiles and/or user information associated with users of the system 10. The one or more user profiles and/or user information may include information stored by server 12, one or more of the client computing platforms 34, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual (or real) currency account information (e.g., related to currency held in credit for a user), relationship information (e.g., information related to relationships between users in the virtual space), virtual space usage information (e.g., a log-in history indicating the frequency and/or amount of times the user logs-in to the user accounts, information related to the current log-in state of the user, and/or other information), demographic information associated with users, interaction history among users in the virtual space, information stated by users, browsing history of users, a client computing platform identification associated with a user, a phone number associated with a user, and/or other information related to users.

The user component 18 may be configured to manage one or more user inventories of virtual items and/or currency that the users can use within the virtual space. A user may have one or more game inventories of one or more virtual items and/or currency that the user can use (e.g., by manipulation of one or more user characters or other user controlled element, and/or other items) to perform in-game actions within the virtual space. The inventories can be determined on a game-to-game basis for one or more games available within the virtual space, or for one or more games in one or more other virtual spaces. The inventories may encompass multiple inventories of virtual items across multiple games played by the user.

Virtual items may be acquired by the user in one or more of a variety of ways. For example, virtual items may be acquired through gameplay, purchased by the user in a virtual shop, received from another user, bestowed on the user as a part of a promotion, and/or acquired in other ways.

Acquiring virtual items through gameplay may include completing tasks such as finishing levels, defeating enemies, obtaining status, and/or other tasks, and/or by other gameplay mechanisms. Users may decide to complete certain tasks in order to acquire and/or upgrade to virtual items which are the result of completing the task. Users may receive items from one or more other users. Users may receive items from interaction with objects positioned within the virtual space capable of real-time interaction, and/or other mechanisms. Bestowing of items as part of a promotion may include promotions implemented by the game components 16 to reward the user, and/or other mechanism implemented by the game component 16.

Acquiring items from a virtual shop may include purchasing items from a virtual shop within the virtual space. Purchase may include purchasing items using virtual currency, real currency, and/or other consideration. An instance of a virtual shop may be provided through the execution of a shop component 20, described in more detail herein.

In some implementations, user inventories may include user-level inventories, character-level inventories, and/or other inventories including one or more virtual items. User-level inventories may include one or more virtual items that transcend multiple deaths of virtual characters controlled by the users in the virtual space (described in more detail herein with reference made to the user-level items component 22, lifespan parameters component 24, and gameplay parameters component 26). Character-level inventories may include one or more virtual items associated with the individual virtual characters controlled by the users in the online game. In some implementations, the character-level inventories themselves may be associated with the individual virtual characters such that any items included in the character level inventories are only available to the associated character.

Transcending multiple character death may refer to virtual items being made available to the users after the permanent death of one or more virtual characters controlled by the users. For example, virtual items included in the user-level inventories may be available for use by a user with a subsequent character after the death of the character which was used when the virtual item was acquired. Such virtual items may be termed "user-level virtual items", "heirloom virtual items", and/or other term which distinguishes the items from other times which do not transcend multiple character death (described in more detail herein).

Prior to, during, and/or after acquisition of virtual items, the users may be informed of whether or not the virtual item is of the type which transcends multiple character deaths. In some implementation, user-level virtual items which transcend multiple character death may include a name, visual indicator displayed in-game, and/or other identifier which distinguishes the item as such.

The virtual items included in the user-level inventories may be characterized by gameplay parameters that impact gameplay in the online game (described in more detail herein with reference to the gameplay parameters component 26), lifespan parameters that determine the number of characters over which the virtual items will be available (described in more detail herein with reference to the lifespan parameters component 24), and/or other considerations of characterization of the user-level virtual items.

Character-level inventories may include virtual items which are associated with the individual characters controlled by the users. Virtual items may be associated with the individual characters by virtue of the virtual items being acquired when the user is controlling the given character. Virtual items associated with characters may only be usable by the characters which were controlled by the users when the items were acquired. Therefore, after a given character dies, the virtual items included in the character-level inventory associated with the given character may be removed and/or otherwise made unavailable to the user when a subsequent character is taken on (e.g., virtual items must be acquired again).

By way of illustration in FIG. 2, the user component 18 may be configured to manage a first user-level inventory 42 including a first user-level virtual item 44 (and/or other items) available for use by a first user 40 of the virtual space. The first user-level virtual item 44 and/or other items included in the first user-level inventory 42 may be virtual items which transcend multiple character deaths, as described herein. Any virtual items included in a first user-level inventory 42 for the first user 40 may be usable, for example, with both the first character and the second character (and/or other characters) subsequent to the death of the first character (e.g., or other characters).

The user component 18 may be configured to manage a first character-level inventory 46 including a first character-level virtual item 48 (and/or other virtual items) available for use by the first user 40. The first character-level inventory 46 may be associated with the first character such that any of the virtual items included in the first character-level inventory 46 for the first user 40 are usable with the first character and not the second character (or other characters) subsequent to the death of the first character.

Returning to FIG. 1, the shop component 20 may be configured to effectuate presentation of a virtual shop to the users of the virtual space and/or online game taking place within the virtual space. The virtual shop may be a simulated environment within the virtual space which is accessible by users and presents the views of the virtual shop to the users. Users may access the virtual shop through one of a variety of ways. Users may access the virtual shop through the manipulation of one or more user characters associated with the user within the virtual space using control inputs and/or commands input by the users through client computing platforms, and/or other way of access.

Manipulation of a character may include moving the one or more user characters through the virtual space using control inputs and/or commands input by the users through client computing platforms, to move the one or more characters to the simulated environment designating the location of the virtual shop within the virtual space.

Users may use control inputs and/or commands not associated with the one or more user characters to access the virtual shop. Control inputs and/or commands may automatically present the instance of the game shop on the clients computing platforms (e.g., user selects a virtual shop button to automatically be taken to the virtual shop).

The instance of the virtual shop may be presented to users through a shop interface. The shop interface may be configured to present the offers to sell virtual items to users. The shop interface may be configured to receive entry and/or selection of individual offers by the users to effectuate acceptance and/or purchase of the offers at a virtual (or real) currency purchase price.

The simulated environment of the virtual shop may have topography. The virtual shop may express ongoing real-time interaction by one or more users (e.g., may have limited stock of virtual items for sale which can be purchased by one or more users within the virtual space which can be depleted), and/or include one or more objects (e.g., one or more virtual items, a virtual teller, and/or other objects) positioned within the topography that may be capable of locomotion within the topography. The virtual shop may display virtual items available for purchase by the users. Users may view the virtual items available for purchase. Users may purchase the virtual items using virtual currency, real currency, and/or other consideration. Transactions may take place with the virtual teller, through various other actions of the user within the instance of the virtual shop, and/or other transaction mechanisms.

The user-level items component 22 may be configured to maintain the lifespan parameters (determined by the lifespan parameters component 24), gameplay parameters (determined by the gameplay parameters component 26) and/or other parameters of the user-level items included in the user-level inventories. As described in more details herein, the lifespan parameters, gameplay parameters, and/or other parameters of the user-level virtual items may change during gameplay.

By way of illustration in FIG. 2, the user-level items component 22 may be configured to manage the gameplay parameters 50, lifespan parameters 52, and/or other parameters of the first user-level virtual item 44.

Returning to FIG. 1, the lifespan parameters component 24 may be configured to determine the lifespan parameters of the user-level virtual items included in the user-level inventories. Lifespan parameters may determine the number of characters (e.g., character deaths) over which the virtual items will be available. In some implementations, a character death may be considered a character "generation". Therefore, in some implementations, the lifespan parameters may be expressed as a number of characters and/or character generations over which the virtual items will be available. In some implementations, the lifespan parameters may change during gameplay.

In some implementation, the lifespan parameters component 24 may be configured such that determining lifespan parameters of user-level virtual items includes one or more of determining an initial number of characters over which the user-level virtual items will be available, decrementing the lifespan parameters, incrementing the lifespan parameters, and/or other operations. When the lifespan parameter reaches a threshold level, the lifespan of the user-level virtual items may end such that the user-level virtual items are no longer made available to the user. This may include the user-level virtual item being removed from the user-level inventory, the user-level virtual item being deactivated, and/or other considerations.

The lifespan parameters component 24 may be configured such that the initial number of characters over which the virtual items will be available may be a number which may be determined randomly, based on a pre-determined number, and/or by other considerations. In some implementations, the initial number of characters over which the virtual items will be available may be pre-determined based on the type of virtual items, the attributers of the item, the cost and/or value of the item, and/or based on other measures. For example, high value items may be determined to have lower lifespan parameters than lower value items. The initial number of characters of which the user-level virtual items are made available may be determined in other ways.

The lifespan parameters component 24 may be configured such that decrementing the lifespan parameters of any of the items included in the user-level inventories is performed responsive to the death of a virtual character. In some implementations, the lifespan parameter may be decremented by a unit amount (or other amount) in response to the death of an individual character. For example, a user may acquired a user-level virtual item having an initial lifespan parameter of 3 character generations, and subsequent to the death of the character controlled by the user, the lifespan parameter of the virtual item may be decremented by 1 character generation (or other amount) to 2 character generations. When the lifespan parameter reaches a threshold value (e.g., "0" character generations), the user-level virtual item may be removed from the user-level inventory, the benefits of the virtual item may be deactivated, and/or the virtual item may otherwise become unusable by the user for any character.

The lifespan parameters component 24 may be configured such that incrementing the lifespan parameters may be performed responsive to receiving consideration from the users. Consideration received from the users to increment the lifespan parameters may be satisfied in an exchange of virtual items, virtual currency, real currency, and/or other consideration (e.g., via a virtual shop). The amount the lifespan parameter is incremented may be based on the amount of consideration received from the users. In some implementations, the amount to increment the lifespan parameters by a unit amount may be pre-determined, may vary depending on the type of virtual item, and/or may be based on other considerations (e.g., the player ranking).

In some implementations, the lifespan parameter component 24 may be restricted to incrementing the lifespan parameters to a threshold value (e.g., up to 10 character generations or other threshold amount). In some implementations, the lifespan parameters component may be configured such that the lifespan parameters can be incremented without limitation. Incrementing the lifespan parameters may be considered in other ways and/or in accordance with other restrictions (e.g., based on in-game performance, ranking, completion of in-game tasks, and/or other considerations).

By way of illustration in FIG. 2, the lifespan parameters component 24 may be configured to determine the lifespan parameter 52 for the first virtual item 44 included in the first user-level inventory 42. Such determining may include determining an initial number (e.g., initial lifespan 54) of characters over which the first virtual item 44 will be available, e.g., 5 character generations (and/or other amount). Such determining may also include decrementing 58 the lifespan parameter 52 (e.g., the initial lifespan 54) of the first virtual item 44 (and/or any virtual items) included in the first user-level inventory 42 responsive to the death of the first character. Decrementing 58 the first number of characters (e.g., initial lifespan 54) may include decrementing the number (e.g., 5 character generations) by a unit amount (e.g., 1 character generation) responsive to the death of the first character. The lifespan parameter 52 may be further decremented responsive to the death of subsequent characters, such as the second character.

The lifespan parameters component 24 may be configured such that the lifespan parameter 52 of the first user-level virtual item 44 may be incremented 62 responsive to receiving first consideration 60 from the first user 40. The amount that the lifespan parameter is incremented 62 may be based on the amount of the first consideration 60 received from the first user 40.

Returning to FIG. 1, the gameplay parameters component 26 may be configured to determine the gameplay parameters of the user-level virtual items. Gameplay parameters of the user-level virtual items included in the user-level inventories may include different benefits that the user-level virtual items provide the users during gameplay in the online game when the different benefits are activated. The different benefits may correspond to different attributes of the virtual items being implemented when the benefit is activated and the virtual item is used. Attributes may include one or more of damage amount, strength, speed, agility, power, health, and/or other attribute related to an enhancement provide by the use of the item. In some embodiments, the attributes of the virtual items may be determined randomly and/or by other considerations.

For example, a user may acquired a given user-level virtual item. The gameplay parameters of the given item may include benefits such as 5× damage to opponents, 2× increase in character agility, 2× increase in player speed, and/or other benefits. The benefits may be activated (individually or in groups) such that one or more of the benefits may be made available to the user when the virtual item is used.

In some implementations, the benefits included in the gameplay parameters of the user-level virtual items may be activated such that the benefit(s) are made available to the user using the virtual item. The activation of benefits may be considered in a variety of ways. The gameplay parameters component 26 may determine to activate one or more benefits based on one or more of consideration being received from the users, users completing in-game tasks, and/or by other considerations.

In some implementations the gameplay parameters component 26 may determine to activate one or more benefits based on consideration received by the users. Consideration received from the users to activate different benefit may be satisfied in an exchange of virtual items, virtual currency, or real currency. For example, users may exchange virtual, real, and/or other currency consideration (e.g., via a virtual shop) to activate one or more benefits of a user-level virtual item included in their user-level inventory. The activation of more then one benefit may require a higher consideration amount to be exchanged than the activation of a single benefit. Once activated, the user-level virtual item may maintain the activated benefit, may "time-out" the benefit and become de-activated after a period of time, and/or other considerations.

In some implementations, users may exchange virtual items to activate the benefits of the user-level virtual items. An exchange of virtual items may include forfeiting the virtual item to activate one or more benefits (e.g., via virtual shop), combining a virtual item with the user-level virtual items to "unlock" one or more benefits (e.g., referred to as "socketing"), and/or other consideration. Virtual items which may be socketed in the user-level virtual items may activate one or more benefits based on the the "level" of the socketable virtual item. For example a "level 1" socketable virtual item may activate one benefit of the user-level virtual items, a "level 2" socketable virtual item may activate two benefits of the user-level virtual items, a "level 3" socketable virtual item may activate three benefits of the user-level virtual items, and so forth. The level of the socketable virtual items may be known to the users when the socketable virtual items are acquired by the users. In some implementations, the level of the socketable virtual items may be unknown to the users until the virtual item is socketed to the user-level virtual item.

In some implementations different benefits may be activated based the users completing in-game tasks and/or actions. For example, a user may acquire a user-level virtual item (e.g., via purchase through a virtual shop), and may be prompted (e.g., via a pop-up window, notification, message, etc.) to complete an in-game tasks and/or action (e.g., complete a level, defeat an enemy, etc.) to activate one or more of the benefits thereof. Activation of different benefits may be considered in other ways.

In some implementations, the user-level virtual items may initially (e.g., at the time of acquisition of the user-level virtual item) be unusable (e.g., no benefits activated) until the user activates one or more of the benefit levels as described herein. In some implementations, the user-level virtual items may initially be activated with one benefit wherein users may choose to activate additional benefits accordingly.

In some implementations, the benefits associated with the user-level virtual items may be upgraded. Users may acquire "upgrades" for the user-level virtual item benefits via purchase and/or other acquisition technique. An "upgrade" may be applied to one or more of the benefits. For example, following the above example, a user may upgrade the gameplay parameters of the given item to 10× damage to opponents, 4× increase in character agility, 6× increase in player speed, and/or more or less upgrades.

By way of illustration in FIG. 2, the gameplay parameters component 26 may be configured to activate one benefit 66 of the first user-level virtual item 44 responsive to receiving second consideration 64 from the first user 40. The gameplay parameters component 26 may be configured to activate two benefits 70 of the first user-level virtual item 44 responsive to receiving third consideration 68 from the first user 40. The third consideration 68 may be more than the second consideration 64.

The above examples are provided for illustrative purposes only and are not intended to be limiting. It is to be understood that the determination of gameplay parameters, benefits, benefit activation, and/or upgrades associated therewith may be considered in other ways.

Returning to FIG. 1, the server 12, client computing platforms 34, and/or external resources 38 may be operatively linked via one or more electronic communication links. For example, such electronic communication links may be established, at least in part, via a network 32 such as the Internet and/or other networks. It will be appreciated that this is not intended to be limiting, and that the scope of this disclosure includes implementations in which servers 12, client computing platforms 34, and/or external resources 38 may be operatively linked via some other communication media.

The external resources 38 may include sources of information, hosts and/or providers of virtual spaces outside of system 10, external entities participating with system 10, external entities for player-to-player communications, and/or other resources. In some implementations, some or all of the functionality attributed herein to external resources 38 may be provided by resources included in system 10.

The server 12 may include electronic storage 30, one or more processors 14, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 30 may comprise electronic storage media that electronically stores information. The electronic storage media of electronic storage 30 may include one or both of system storage that is provided integrally (i.e., substantially non-removable) with server 12 and/or removable storage that is removably connectable to server 12 via, for example, a port or a drive. A port may include a USB port, a firewire port, and/or other port. A drive may include a disk drive and/or other drive. Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 30 may include one or more virtual storage resources (e.g., cloud storage, a virtual private network, and/or other virtual storage resources). Electronic storage 30 may store software algorithms, information determined by processor 14, information received from server 12, information received from client computing platforms 34, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include one or more processing units. These processing units may be physically located within the same device, or processor 14 may represent processing functionality of a plurality of devices operating in coordination. The processor 14 may be configured to execute components 16, 18, 20, 22, 24, 26, 28. Processor 14 may be configured to execute components 16, 18, 20, 22, 24, 26, 28 by software; hardware; firmware; some combination of software, hardware, and/or firmware; and/or other mechanisms for configuring processing capabilities on processor 14.

It should be appreciated that although components 16, 18, 20, 22, 24, 26, 28 are illustrated in FIG. 1 as being co-located within a single processing unit, in implementations in which processor 14 includes multiple processing units, one or more of components 16, 18, 20, 22, 24, 26, 28 may be located remotely from the other components. The description of the functionality provided by the different components 16, 18, 20, 22, 24, 26, 28 described above is for illustrative purposes, and is not intended to be limiting, as any of components 16, 18, 20, 22, 24, 26, 28 may provide more or less functionality than is described. For example, one or more of components 16, 18, 20, 22, 24, 26, 28 may be eliminated, and some or all of its functionality may be provided by other ones of components 16, 18, 20, 22, 24, 26, and/or 28 and/or other components. As another example, processor 14 may be configured to execute one or more additional components that may perform some or all of the functionality attributed below to one of components 16, 18, 20, 22, 24, 26, 28.

Figure 3:
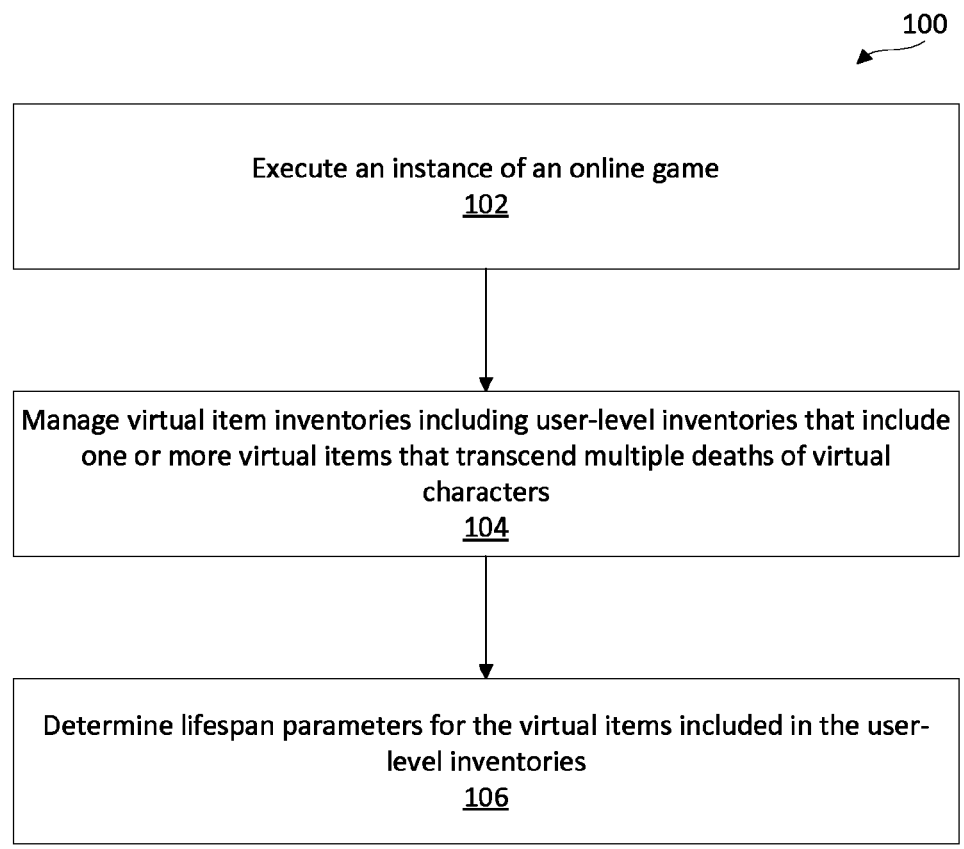
FIG. 3 illustrates a method of online gaming including virtual items that transcend multiple character deaths.

FIG. 3 illustrates a method 100 of online gaming including virtual items that transcend multiple character deaths. The operations of method 100 presented below are intended to be illustrative. In some implementations, method 100 may be accomplished with one or more additional operations not described, and/or without one or more of the operations discussed. Additionally, the order in which the operations of method 100 are illustrated in FIG. 3 and described below are not intended to be limiting.

In some implementations, method 100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

Referring now to method 100 in FIG. 3, at an operation 102 an instance of a online game taking place within a virtual space may be executed. The instance of the online game may be implemented to facilitate user participation in the online game. Users may participate with the online game by controlling virtual characters in the virtual space. Health parameters of the characters in the online game may be determined wherein responsive to the health parameter for the individual characters reaching a threshold level; the characters may be considered dead in the online game. In some implementations, operation 102 may be performed by a game component the same as or similar to game component 16 (shown in FIG. 1 and described herein).

At an operation 104, virtual item inventories associated with the users in the online game may be managed. The inventories may include one or more virtual items available for use with characters controlled by the users in the online game. The inventories may include user-level inventories that include one or more virtual items that transcend multiple deaths of virtual characters. The virtual items included in the user-level inventories may be characterized by gameplay parameters that impact gameplay in the online game, and lifespan parameters that determine the number of characters over which the virtual items will be available. In some implementations, operation 104 may be performed by a user component the same as or similar to user component 18 (shown in FIG. 1 and described herein).

At an operation 106, the lifespan parameters for the virtual items included in the user-level inventories may be determined. Such determining may include decrementing the lifespan parameter of any virtual items included in the user-level inventories responsive to the death of a player character. In some implementations, operation 106 may be performed by a lifespan parameters component the same as or similar to lifespan parameters component 24 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for online gaming including virtual items that transcend virtual character death, the system comprising:
one or more physical processors configured by computer-readable instructions to:
execute an instance of an online game, and to use the instance to generate game state information that is transmitted to client computing platforms over a network, the game state information facilitating presentation of views of a virtual space in which the online game takes place to the users via the client computing platforms, wherein execution of the instances of the online game further enables participation in the online game, such that the users participate with the online game by inputting commands for controlling virtual characters in the virtual space via the client computing platforms, the commands being received over the network from the client computing platforms, the virtual characters including a first virtual character controlled by a first user, wherein a health parameter of the characters in the online game is determined, and wherein responsive to the health parameter for the first character reaching a threshold level, the first character is considered dead in the online game and is no longer available to the first user such that subsequent to such death of the first character the first user must control a second character in the virtual space to participate in the online game;
manage virtual item inventories associated with the users in the online game, the inventories including one or more virtual items available for use with characters controlled by the users in the online game, the inventories including user level inventories that include one or more virtual items that transcend multiple deaths of virtual characters such that any virtual items included in a first user-level inventory for the first user become usable with the second character subsequent to the death of the first character, wherein the virtual items included in the user-level inventories are characterized by gameplay parameters that impact gameplay in the online game, and lifespan parameters that determine the number of characters over which the virtual items will be available; and
determine the lifespan parameters for the virtual items included in the user-level inventories, such determining including (i) determining an initial number of characters over which the virtual items will be available including determining a first number of characters over which a first virtual item included in the first user-level inventory will be available, and (ii) decrementing the lifespan parameter of any virtual items included in the first user-level inventory responsive to the death of the first character.

2. The system of claim 1 wherein the one or more physical processors are configured by computer-readable instructions such that decrementing the lifespan parameter of any virtual items included in the first user-level inventory responsive to the death of the first character comprises decrementing the first number of characters by a unit amount responsive to the death of the first character.

3. The system of claim 1 wherein the one or more physical processors are configured by computer-readable instructions such that the gameplay parameters of the virtual items included in the user-level inventories include benefits that the virtual items provide the users during gameplay in the online game when the benefits are activated.

4. The system of claim 3 wherein the one or more physical processors are configured by computer-readable instructions such that the benefits are activated based on consideration received from the users.

5. The system of claim 4 wherein the one or more physical processors are configured by computer-readable instructions such that the consideration received from the users to activate the benefits is satisfied in an exchange of virtual items, virtual currency, or real currency.

6. The system of claim 1 the one or more physical processors are configured by computer-readable instructions to effectuate presentation of offers to sell virtual items to users for consideration through a shop interface.

7. The system of claim 1 wherein the one or more physical processors are configured by computer-readable instructions such that determining the lifespan parameters for the virtual items included in the user-level inventories includes incrementing the lifespan parameter of any virtual items included in the first user-level inventory responsive to receiving consideration from the first user.

8. The system of claim 7 wherein the one or more physical processors are configured by computer-readable instructions such that the consideration received from the users to increment the lifespan parameters is satisfied in an exchange of virtual items, virtual currency, or real currency.

9. The system of claim 1 wherein the one or more physical processors are configured by computer-readable instructions such that the virtual item inventories include character-level inventories that include one or more virtual items associated with the individual virtual characters controlled by the users in the online game, such that any virtual items included in a first character-level inventory for the first user are usable with the first character and not the second character subsequent to the death of the first character.

10. A method of conducting an online gaming including virtual items that transcend multiple character deaths, the method being implemented in a computer system including one or more physical processors and storage media storing machine-readable instructions, the method comprising:
executing an instance of an online game, and using the instance to generate game state information that is transmitted to client computing platforms over a network, the game state information facilitating presentation of views of a virtual space in which the online game takes place to the users via the client computing platforms, wherein execution of the instances of the online game further enables user participation in the online game, such that the users participate with the online game by inputting commands for controlling virtual characters in the virtual space via the client computing platforms, the commands being received over the network from the client computing platforms, the virtual characters including a first virtual character controlled by a first user, wherein a health parameter of the characters in the online game is determined, and wherein responsive to the health parameter for the first character reaching a threshold level, the first character is considered dead in the online game and is no longer available to the first user such that subsequent to such death of the first character the first user must control a second character in the virtual space to participate in the online game;

managing virtual item inventories associated with the users in the online game, the inventories including one or more virtual items available for use with characters controlled by the users in the online game, the inventories including user-level inventories that include one or more virtual items that transcend multiple deaths of virtual characters such that any virtual items included in a first user-level inventory for the first user become usable with the second character subsequent to the death of the first character, wherein the virtual items included in the user-level inventories are characterized by gameplay parameters that impact gameplay in the online game, and lifespan parameters that determine the number of characters over which the virtual items will be available; and determining the lifespan parameters for the virtual items included in the user-level inventories, such determining including (i) determining an initial number of characters over which the virtual items will be available including determining a first number of characters over which a first virtual item included in the first user-level inventory will be available, and (ii) decrementing the lifespan parameter of any virtual items included in the first user-level inventory responsive to the death of the first character.

11. The method of claim 10 wherein decrementing the lifespan parameter of any virtual items included in the first user-level inventory responsive to the death of the first character comprises decrementing the first number of characters by a unit amount responsive to the death of the first character.

12. The method of claim 10 wherein the gameplay parameters of the virtual items included in the user-level inventories include benefits that the virtual items provide the users during gameplay in the online game when the benefits are activated.

13. The method of claim 12 wherein the one or more physical processors are configured by computer-readable instructions such that the benefits are activated based on consideration received from the users.

14. The method of claim 13 wherein the consideration received from the users to activate the benefits is satisfied in an exchange of virtual items, virtual currency, or real currency.

15. The method of claim 10 additionally comprising effectuating presentation of offers to sell virtual items to users for consideration through a shop interface.

16. The method of claim 10 wherein determining the lifespan parameters for the virtual items included in the user-level inventories includes incrementing the lifespan parameter of any virtual items included in the first user-level inventory responsive to receiving consideration from the first user.

17. The method of claim 16 wherein the consideration received from the users to increment the lifespan parameters is satisfied in an exchange of virtual items, virtual currency, or real currency.

18. The method of claim 10 wherein virtual item inventories include character-level inventories that include one or more virtual items associated with the individual virtual characters controlled by the users in the online game, such that any virtual items included in a first character-level inventory for the first user are usable with the first character and not the second character subsequent to the death of the first character.

* * * * *